United States Patent [19]

Ishiguro et al.

[11] Patent Number: 5,022,904
[45] Date of Patent: Jun. 11, 1991

[54] METHOD OF MAKING OPTICAL GLASS ARTICLE

[75] Inventors: Yoichi Ishiguro; Hiroo Kanamori; Akira Urano; Michihisa Kyoto, all of Yokohama, Japan

[73] Assignee: Sumitomo Electric Industries, Ltd., Osaka, Japan

[21] Appl. No.: 537,010

[22] Filed: Jun. 13, 1990

Related U.S. Application Data

[63] Continuation of Ser. No. 338,674, Apr. 17, 1989, abandoned, which is a continuation-in-part of Ser. No. 161,140, Feb. 26, 1988, abandoned, which is a continuation-in-part of Ser. No. 947,432, Dec. 29, 1986, abandoned.

[30] Foreign Application Priority Data

Dec. 27, 1985 [JP] Japan .................................. 60-293060
Nov. 10, 1986 [JP] Japan .................................. 61-265665

[51] Int. Cl.$^5$ ........................................... C03B 37/014
[52] U.S. Cl. ........................................... 65/2; 65/3.12; 65/DIG. 16; 65/30.1
[58] Field of Search .................. 65/3.12, 3.14, 2, 30.1, 65/3.11, 18.2, DIG. 16

[56] References Cited

U.S. PATENT DOCUMENTS

| | | | |
|---|---|---|---|
| 4,593,050 | 6/1986 | Cohen | 204/157.61 X |
| 4,610,709 | 9/1986 | Kawavchi | 65/3.12 |
| 4,618,354 | 10/1986 | Suda | 65/18.2 X |
| 4,620,861 | 11/1986 | Berkey | 65/3.12 |
| 4,629,485 | 12/1986 | Berkey | 65/18.2 X |
| 4,693,738 | 9/1987 | Hoshikawa | 65/3.11 |

FOREIGN PATENT DOCUMENTS 60-81033 5/1985 Japan .................. 65/DIG. 16
61-174138 8/1986 Japan .

*Primary Examiner*—Kenneth M. Schor
*Attorney, Agent, or Firm*—Cushman, Darby & Cushman

[57] ABSTRACT

A refractive index profile in a glass article is easily controlled by heating a solid or hollow cylindrical glass soot preform in an atmosphere comprising a fluorine-containing compound under such conditions that a partial pressure of the fluorine-containing compound is changed as the heating proceeds so as to control a fluorine concentration in a radial direction of the optical glass article.

3 Claims, 7 Drawing Sheets

METHOD OF MAKING OPTICAL GLASS ARTICLE

CROSS-REFERENCE TO RELATED APPLICATIONS

This is a continuation of application No. 97/338,674, filed on Apr. 17, 1989, which was abandoned upon the filing hereof, which in turn is a continuation-in-part of application Ser. No. 97/161,140, filed Feb. 26, 1988 and now abandoned, which in turn is a application of 06/947,432, filed Dec. 29, 1986 and now abandoned.

BACKGROUND OF THE INVENTION

1. Field of the Invention

The present invention relates to a method of making an optical glass article, especially useful as an optical transmission line. More particularly, it relates to a method of making a solid or hollow cylindrical optical glass article having a refractive index profile in a radial direction which is formed by controlled addition of fluorine.

2. Description of the Prior Arts

Hitherto, several methods have been proposed to form a refractive index profile in an optical glass article by controlled addition of fluorine.

According to the first method, the refractive index profile is formed during vapor phase axial deposition of glass soot in the VAD method, which is schematically shown in FIG. 1. In this method, a burner 61 is used for supplying a glass-forming raw material (e.g., silicon tetrachloride and the like) for synthesizing glass soot which forms a core part 64 of the glass soot preform. A burner 62 is used for supplying a glass-forming raw material and a fluorine-containing compound for synthesizing glass soot which forms a peripheral part 65 of the glass soot preform. Numeral 63 stands for a glass soot preform. According to this method, fluorine diffuses and is inevitably homogeneously added to the glass soot preform, so that a refractive index profile is always uniform.

The second method is schematically shown in FIG. 2. In this method, a glass soot preform 73 is made in such manner that a core part 74 contains a compound for lowering a vitrification temperature of glass (e.g., $GeO_2$, $P_2O_5$ and the like) in a larger concentration than a peripheral part 75. When the glass soot preform 73 is inserted in a furnace 77 kept at high temperature, since the core part 74 shrinks faster than the peripheral part 75, it is possible to add more fluorine to the peripheral part 75 so as to form a refractive index profile by selecting a concentration of the fluorine-containing compound in a heating atmosphere and timing of the addition of the fluorine-containing compound. However, the second method has a disadvantage that the glass article contains materials other than silica and fluorine although it can realize the refractive index profile.

The third method is described in Preprint 2-183 for 1984 National Meeting of Denshi-Tsushin Gakkai, Hikari Denpa Bumon (Electronic Communication Society, Light and Electric Wave Section) and so on. In this method, a glass soot preform formed so that a core part and a peripheral part have different bulk densities. When fluorine is added to such glass soot preform a furnace kept at high temperature, more fluorine is added to the peripheral part than to the core part since it diffuses more easily into the peripheral part than into the core part due to difference of the bulk density. Thereby, refractive index difference is made between the core and peripheral parts. To achieve 0.3 % of refractive index difference between the core and peripheral parts according to the third method, the peripheral part should have a bulk density of about 0.2 $g/cm^3$ and the core part should have a bulk density larger than 1.5 $g/cm^3$. However, it is extremely difficult to remove residual water from the glass soot preform having a bulk density so large as 1.5 $g/cm^3$.

The fourth method is proposed in Japanese Patent Kokai Publication (unexamined) No. 61-132532. In this method, the refractive index profile is realized by providing glass soot particles with a particle size variation in a radial direction of the glass soot preform so as to vary the vitrification temperature of the glass soot preform in the radial direction, whereby an amount of added fluorine is controlled. Although the fourth method has several advantages such that the transparent glass preform which contains less residual water and no other material than $SiO_2$ and fluorine can be obtained, and the additional fluorine content can be changed in the radial direction, it requires special technique for achieving the particle size variation such as utilization of plasma flame, carbon monoxide flame and the sol-gel method.

The above described four methods are developed to realize the refractive index profile in the optical glass article. On the contrary, it is sometimes desired to make the refractive index profile uniform. However, it is difficult to realize a completely uniform profile of the refractive index in the optical glass article according to the above conventional methods, since the variation of the bulk density of the glass soot preform in the radial direction influences the amount of fluorine to be added.

SUMMARY OF THE INVENTION

One object of the present invention is to provide a method of making a glass article having a designed refractive index profile.

Another object of the present invention is to provide a method of making a glass article suitable for use in optical transmission.

Further object of the present invention is to provide a method of making a glass article which is sufficiently dehydrated.

These and other objects are accomplished by:

a method of making a glass article which comprises heating a solid or hollow cylindrical glass soot preform which has a larger bulk density in an axially extending center part than in a peripheral part surrounding the center part in an atmosphere comprising a fluorine-containing compound and an inert gas to add fluorine to the preform and then vitrifying the fluorine added preform to obtain a transparent glass article, wherein the heating is carried out in two steps under such conditions that a partial pressure of the fluorine-containing compound in the first heating step is 1.3 to 2.5 times higher than that in the second heating step whereby the glass article contains fluorine in substantially the same concentration at any part of the glass article, or a method of making a glass article which comprises heating a solid or hollow cylindrical glass soot preform which has substantially the same bulk density at any part in an atmosphere comprising a fluorine-containing compound and an inert gas under such conditions that a partial pressure of the fluorine-containing compound is increased as the heating proceeds so as to control a fluorine concentration in a radial direction of the glass article so that a peripheral part of the article contains fluorine in a larger concentration than an axially extending center part of the article and then vitrifying the fluorine added preform to obtain a transparent glass article.

DETAILED DESCRIPTION OF THE DRAWINGS

According to the present invention, the refractive index profile in the optical glass article can be designed by controlling the addition amount of fluorine in an radial direction of the cylindrical glass soot preform.

In one embodiment, the glass soot preform has the maximum bulk density at or near a core of the glass soot preform and decreases towards a periphery thereof, and the produced glass article contains fluorine in substantially the same concentration at any part thereof. To achieve such profile of the fluorine concentration, the fluorine addition is carried out in two steps in which the partial pressure of the fluorine-containing compound in the first heating step is adjusted to be 1.3 to 2.5 times, preferably 1.5 to 2.5 times higher than that in the second heating step.

The term "substantially the same concentration" of fluorine is intended to mean that a difference of the fluorine concentration between any two parts of the glass article corresponds to relative refractive index difference of less than 0.05 %, preferably not larger than 0.02%.

In another embodiment, the glass soot preform has substantially the same bulk density at any part thereof, and the fluorine concentration in the produced glass article is such that the concentration is minimum at or near a core of the optical glass article and increases toward a periphery of the glass article. To achieve such profile of the fluorine concentration, the partial pressure of the fluorine-containing compound is adjusted to be 100 Pa or lower at the start of heating and then increased to 100 KPa (0.99 atm.) or higher at a time of completion of vitrification of the glass soot preform. The term "substantially the same bulk density" is intended to mean that a difference of the bulk density between any two parts of the glass soot preform is not larger than 0.5 $g/cm^3$, preferably not larger than 0.3 $g/cm^3$.

Preferable fluorine-containing compounds are silicon fluorides such as $SiF_4$, $Si_2F_6$ and the like, although other fluorine-containing compounds such as $SF_6$, $NH_4F$, $NF_3$, $PF_5$, $CF_4$ and $CCl_2F_2$ are suitably used.

The fluorine-containing compound is introduced in the heating atmosphere together with an inert gas such as helium, argon, nitrogen and so on.

Figure 1:
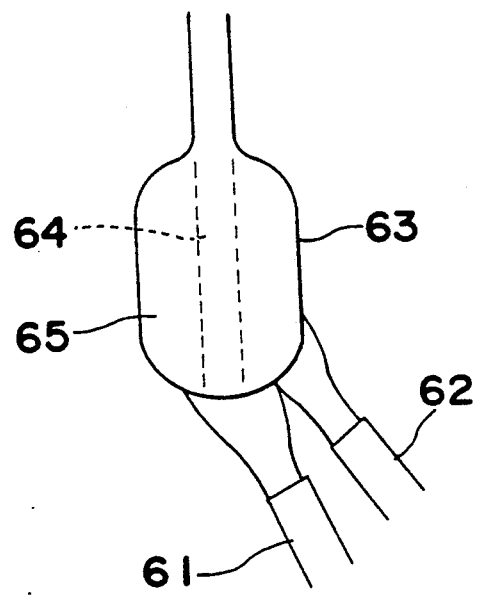
FIGS. 1 and 2 schematically show conventional methods to form a refractive index profile in a glass article, FIG. 3A schematically shows an apparatus for carrying out the method of the present invention which comprises a uniform heating furnace, FIG. 3B schematically shows an apparatus for carrying out the method of the present invention which comprises a zone heating furnace.
Figure 2:
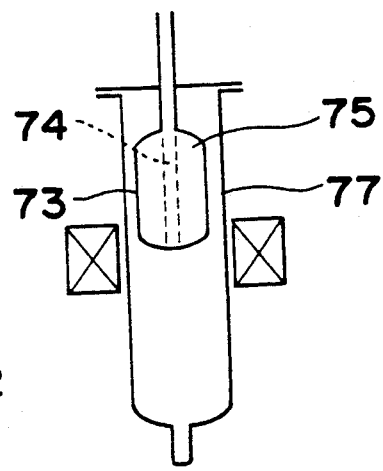
Figure 3A:
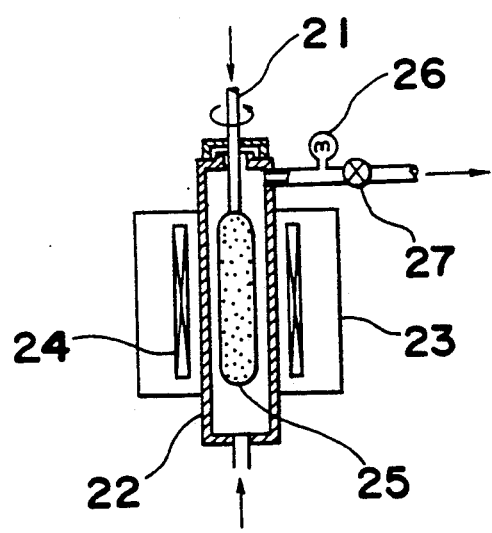
Figure 3B:
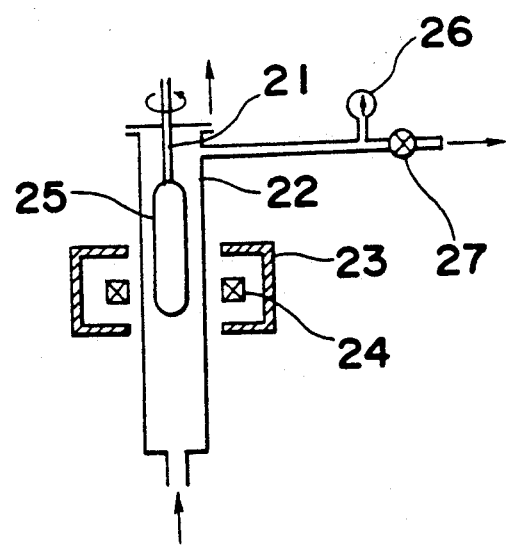

Two preferred apparatus for carrying out the method of the present invention are schematically shown in FIGS. 3A and 3B, respectively. The apparatus of FIG. 3A comprises a uniform heating furnace and that of FIG. 3B comprises a zone heating furnace. In both apparatus, 21 stands for a rotational axis, 22 stands for a muffle, 23 stands for a furnace, 24 stands for a heater, 25 stands for a glass soot preform, 26 stands for a pressure gauge, and 27, stands for a pressure regulator. In a preferred embodiment, a muffle is made of highly pure carbon.

When the uniform heating furnace is used, as the furnace temperature increases and the glass soot preform shrinks, the partial pressure of the fluorine-containing compound is changed following a changing pattern designed according to the fluorine concentration profile which is determined according to the final refractive index profile in the glass article.

When the zone furnace is used, the partial pressure of the fluorine-containing compound and the furnace temperature are determined each time the glass soot preform passes through a heating zone in the furnace.

To decrease a content of water in the glass soot preform, it is preferably heated at a temperature at which it does not shrink prior to heating it in the atmosphere comprising the fluorine-containing compound. In the predehydration, metallic impurities are also removed. Such predehydration of the glass soot preform is useful since the glass soot preform does not shrink and the predehydration does not affect the fluorine addition.

The present invention will be explained further in detail by following examples.

EXAMPLE 1

Figure 4C:
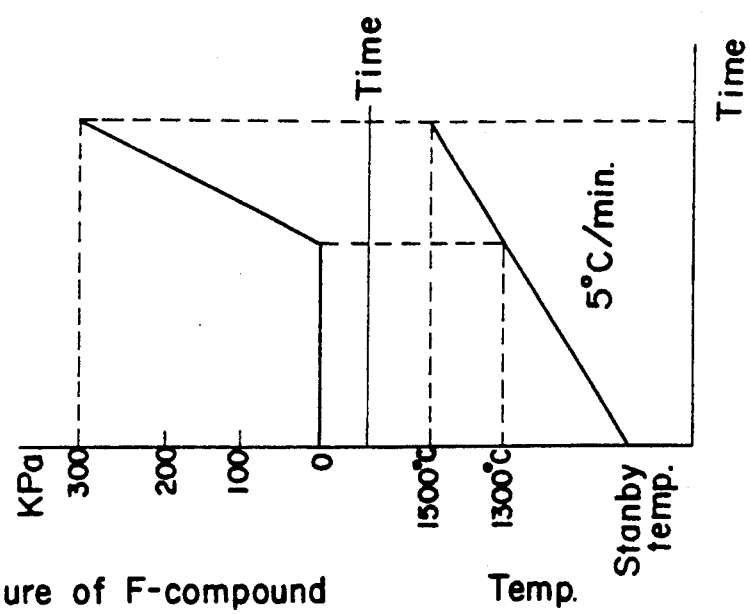
FIGS. 4A, 4B and 4C are graphs showing relationships between heating time and partial pressure of a fluorine-containing compound or temperature in Examples 1, 2 and 3, respectively.
Figure 4A:
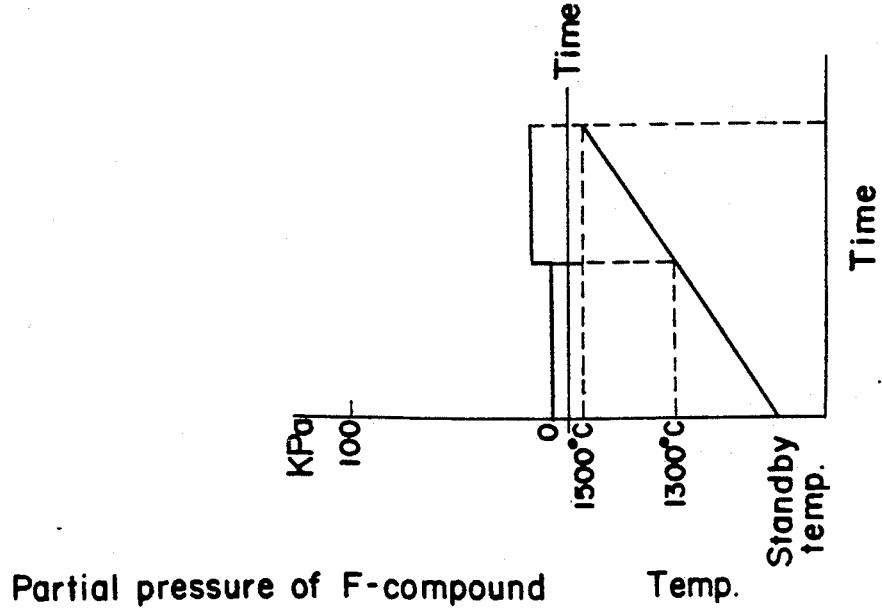
Figure 5C:
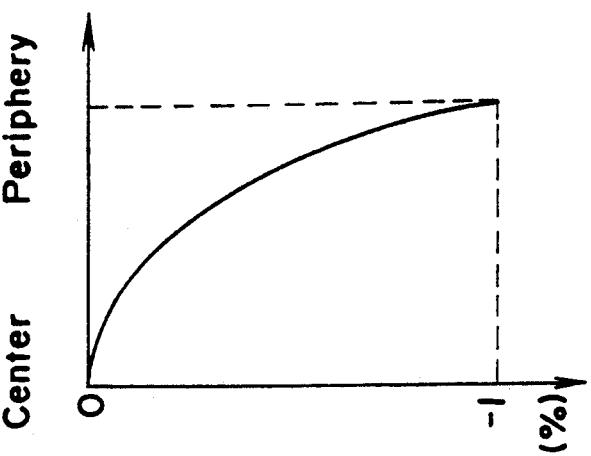
FIGS. 5A, 5B and 5C are graphs showing relative refractive index difference to quartz of the fluorine added glass article made in Examples 1, 2 and 3, respectively.
Figure 5B:
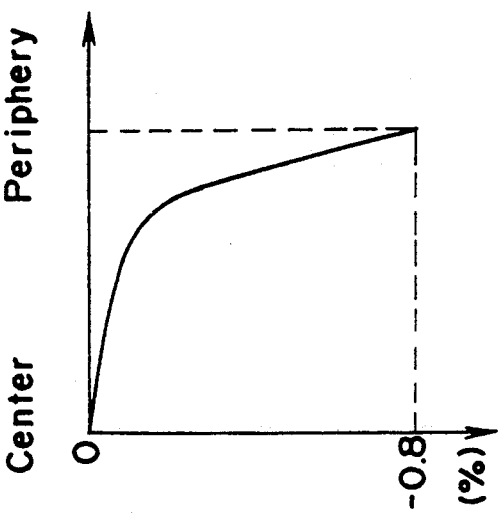
Figure 5A:
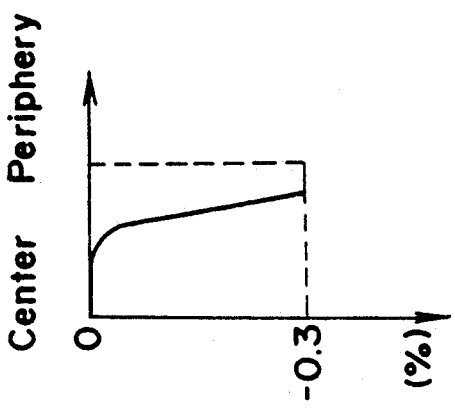

In the uniform heating furnace shown in FIG. 3A, a glass soot preform having substantially the same bulk density of of 0.25 $g/cm^3$ on the average was held, and furnace temperature was raised at a rate of 2° C./min. In the uniform heating furnace, a pure helium was introduced till the furnace temperature reached 1,300° C. Then, $SF_6$ was added at a partial pressure of 3 KPa. Total pressure was atmospheric pressure. Relationships between the heating time and the partial pressure of $SF_6$ or the temperature are shown in FIG. 4A. The preform removed from the furnace at 1,500° C. was transparently vitrified. The transparent glass article had a refractive index profile shown in FIG. 5A.

EXAMPLE 2

Through the zone heating furnace of FIG. 3B, a glass soot preform having substantially the same bulk density of 0.25 g/cm³ on the average was passed three times under conditions shown in the following table:

TABLE 1

| Pass | Temp (°C.) | Atmosphere (%) | Relative (*1) length of preform |
|---|---|---|---|
| 1st | 1,060 | Cl$_2$/He = 2/98 | 1 |
| 2nd | 1,450 | He = 100 | 0.65 |
| 3rd | 1,600 | SiF$_4$ = 100 | 0.5 |

Note (*1)Relative length = A ratio of length of a soot preform after each pass to length of the soot preform the first pass.

Figure 4B:
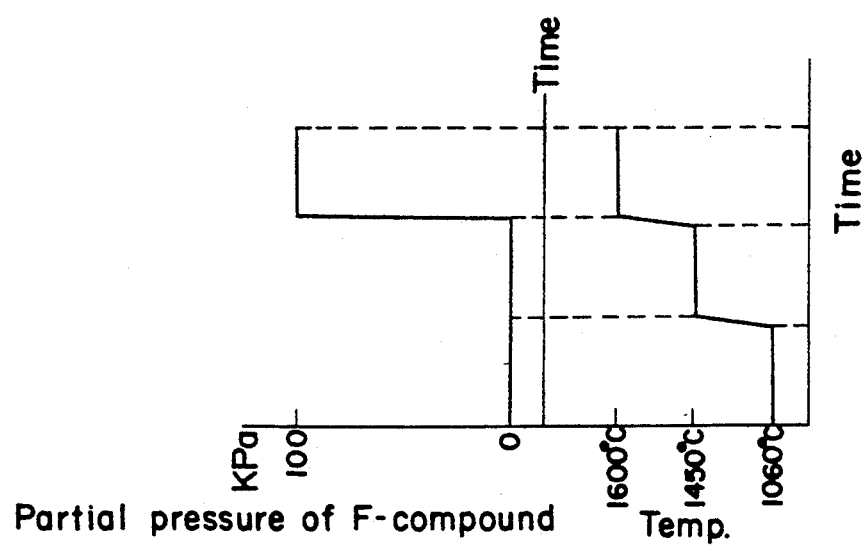

Relationships between the heating time and the partial pressure of SiF$_4$ or the temperature are shown in FIG. 4B. The produced transparent glass article contained no bubbles and had a refractive index profile shown in FIG. 5B.

Figure 6:
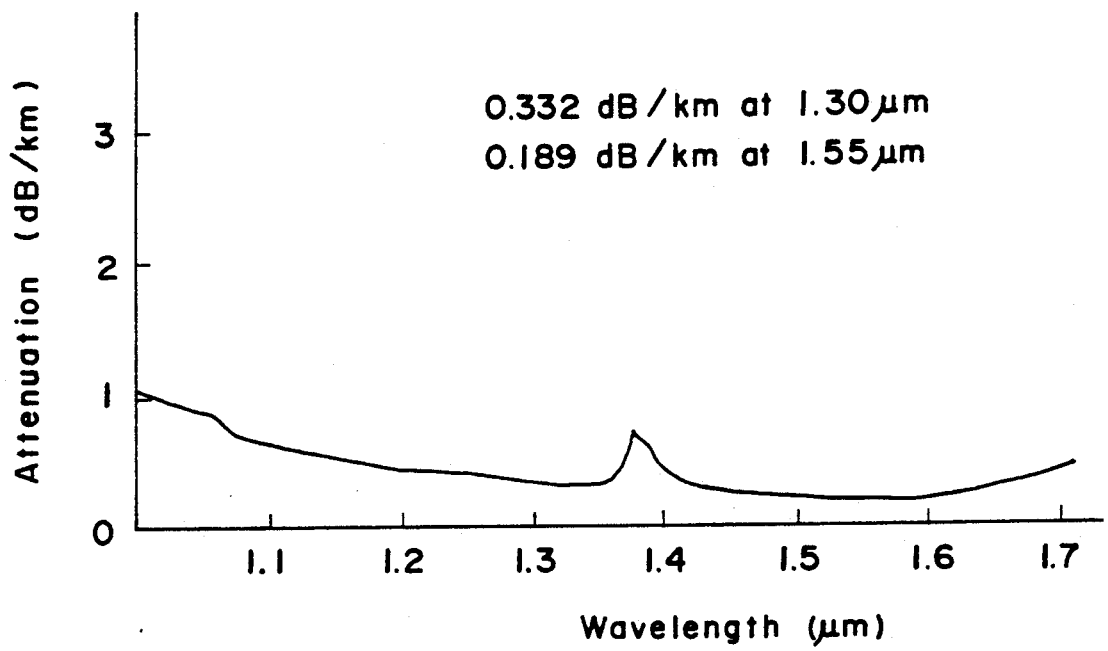
FIG. 6 is a graph showing attenuation spectrum of an optical fiber fabricated from the glass article made in Example 2.

A single mode optical fiber fabricated from this transparent glass article had 0.4 dB/km of absorption due to water at a wavelength of 1.38 μm and 0.19 dB/km of attenuation of light transmission at a wavelength of 1.55 μm. An attenuation spectrum of the optical fiber is shown in FIG. 6.

EXAMPLE 3

In the uniform heating furnace shown in FIG. 3A having a muffle made of highly pure carbon, a glass soot preform having substantially the same bulk density of 0.25 g/cm³ on the average was held, and furnace temperature was raised at a rate of 5° C./min. In the uniform heating furnace, a pure helium was introduced till the furnace temperature reached 1,300° C. Then, the fluorine compound was added with gradually increasing its partial pressure up to 300 KPa in a temperature range of 1,300° C. to 1,500° C. Relationships between the heating time and the partial pressure of the fluorine compound or the temperature are shown in FIG. 4C. The transparently vitrified glass article had a refractive index profile shown in FIG. 5C. A graded index type optical fiber fabricated from this transparent glass article had a waveband of 500 MHz.

EXAMPLE 4

Around a glass rod consisting of a core part of pure silica and a peripheral part of SiO$_2$ containing fluorine, glass soot was deposited by the VAD method to form a composite.

Figure 7:
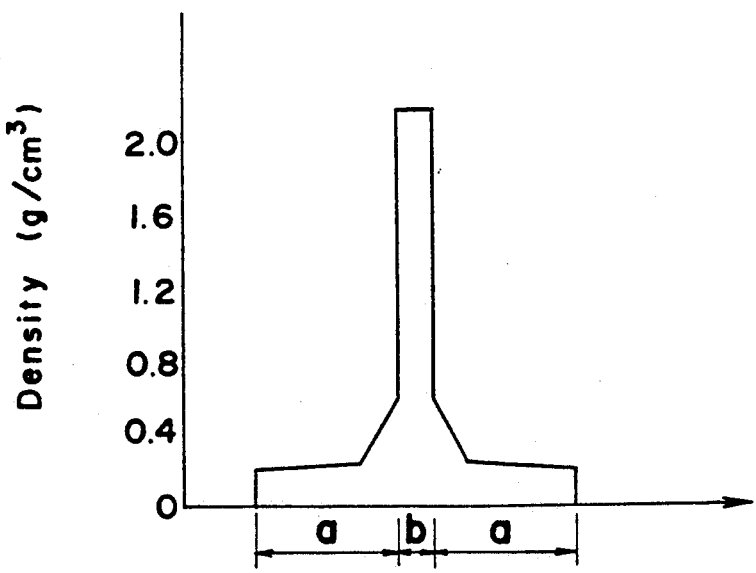
FIG. 7 is a graph showing density of a composite of a glass rod and a glass soot preform used in Example 4.

Distribution of bulk density of the composite was measured undestructively by means of X-ray CT. It is as shown in FIG. 7 It is understood that the bulk density near the rod surface was relatively large. In FIG. 7, "a" stands for a thickness of the deposited soot and "b" stands for a diameter of the glass rod.

The composite was heated by passing it through the zone heating furnace of FIG. 3B three times under conditions shown in the following table:

TABLE 2

| Pass | Temp. (°C.) | Atmosphere (%) | Passing rate of the composite |
|---|---|---|---|
| 1st | 1,060 | Cl$_2$/He = 2/98 | 8 mm/min. |
| 2nd | 1,350 | SiF$_4$/He = 5/95 | 8 mm/min. |
| 3rd | 1,550 | SiF$_4$/He = 3/97 | 14 mm/min. |

Figure 8:
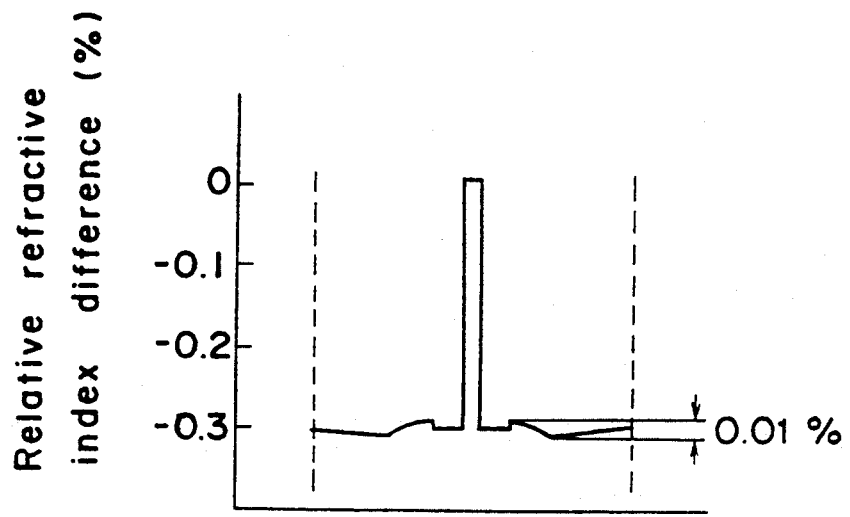
FIG. 8 is a graph showing relative refractive index difference of the glass article made in Example 4.

The transparent glass article had a refractive index profile as shown in FIG. 8, from which it is understood that the difference of the refractive index was not larger than 0.01 % in the deposited part.

COMPARATIVE EXAMPLE 1

In the same manner as in Example 4 but heating the composite under conditions shown in the following table, a transparent vitrified glass article was produced:

TABLE 3

| Pass | Temp. (°C.) | Atmosphere (%) | Passing rate of the composite |
|---|---|---|---|
| 1st | 1,060 | Cl$_2$/He = 2/98 | 8 mm/min. |
| 2nd | 1,350 | SiF$_4$/He = 3/97 | 8 mm/min. |
| 3rd | 1,550 | SiF$_4$/He = 3/97 | 14 mm/min. |

Figure 9:
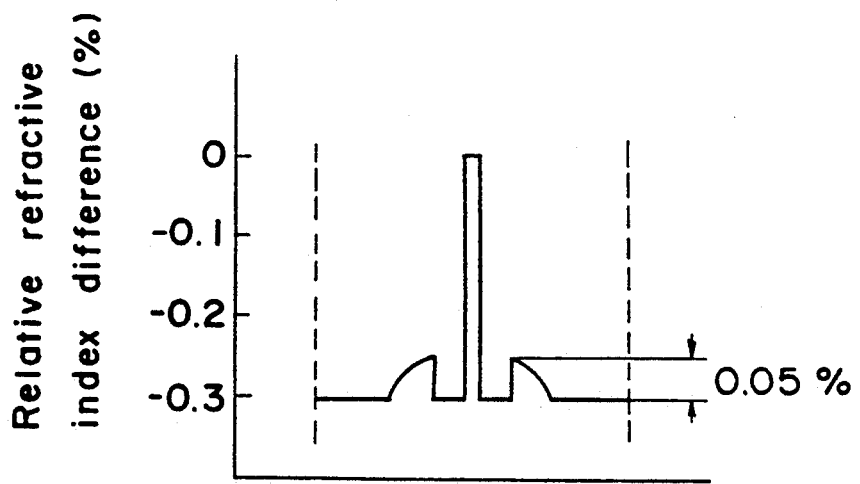
FIG. 9 is a graph showing relative refractive index difference of the glass article made in Comparative Example 1.

The transparent glass article had a refractive index profile as shown in FIG. 9, from which it is understood that, near the glass rod region, the addition amount of fluorine was smaller than in the peripheral region so tnat the difference of the refractive index reached 0.05 % in the deposited part.

COMPARATIVE EXAMPLE 2

When the partial pressure of fluorine-containing compound in the first and second heating steps was the same, it was found that the decrease of the passing rate in the first heating step in the fluorine-containing atmosphere (2nd pass in Examples) would achieve substantially the same fluorine concentration.

In this Comparative Example, the composite produced in the same manner in Example 4 was heated under the conditions shown in the following table:

TABLE 4

| Pass | Temp. (°C.) | Atmosphere (%) | Passing rate of the composite |
|---|---|---|---|
| 1st | 1,060 | Cl$_2$/He = 2/98 | 8 mm/min. |
| 2nd | 1,350 | SiF$_4$/He = 3/97 | 3 mm/min. |
| 3rd | 1,550 | SiF$_4$/He = 3/97 | 14 mm/min. |

In the produced transparent glass article, the difference of the refractive index in the deposited part was 0.01%.

In Comparative Example 1, it took 265 minutes to add fluorine to the deposited soot and to vitrify it (500/5 +500/3 +500/14), while in Example 4, it took only 160 minutes (500/8 +500/8 +500/14). The former is 1.6 times longer than the latter. This deteriorates the productivity of the transparent glass article considerably.

Figure 10:
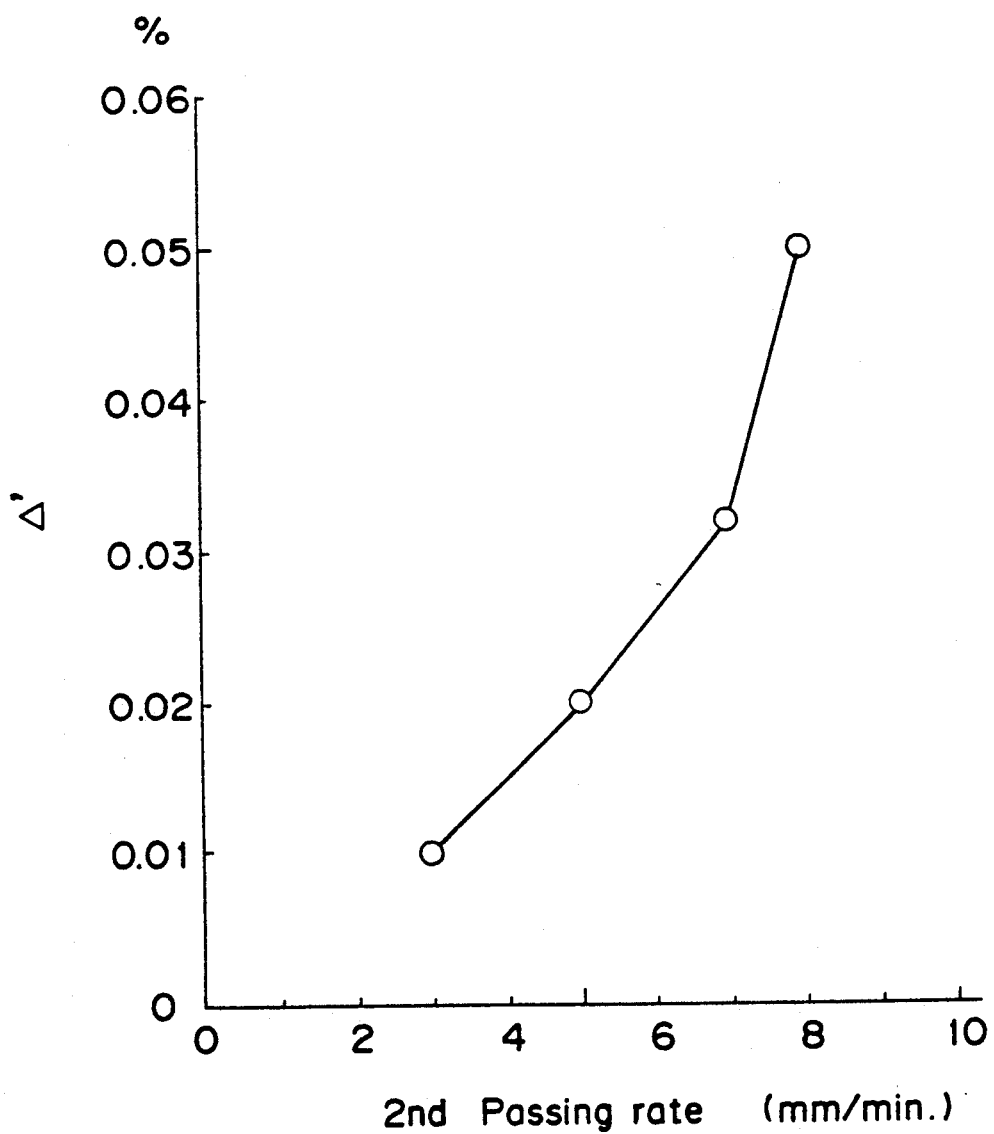
FIG. 10 is a graph showing the relationship between the difference of the refractive index and the second passing rate.

With varying the second passing rate, namely the rate in the first heating step in the fluorine-containing atmosphere, the transparent glass articles were produced. The relationship between the difference of the refractive index W' in the deposited part and the passing rates is shown in FIG. 10.

EXAMPLE 5

Figure 11:
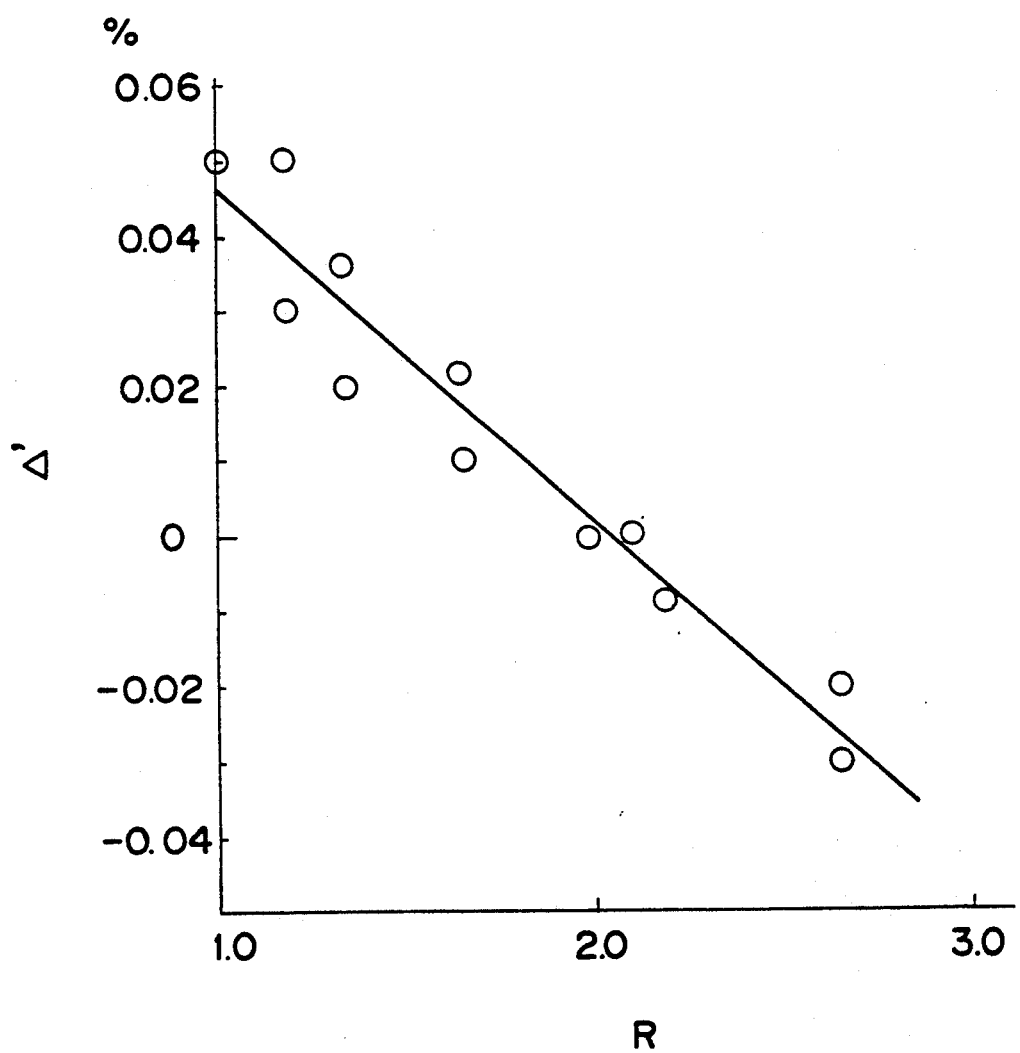
FIG. 11 is a graph showing the relationship between the difference of the refractive index and the ratio of the partial pressure of $SiF_4$ in the first and second heating steps in the fluorine-containing atmosphere.

In the same manner as in Example 4 but changing the ratio R of the concentrations (namely the partial pressures) of SiF$_4$ in the first and second heating steps in the fluorine-containing atmosphere, the transparent glass articles were produced. The results are shown in FIG. 11, from which it is understood that when the ratio R is in the range from 1.3 to 2.5, the difference of the refractive index W' is substantially zero.

According to the present invention, it is possible to make a glass article having a refractive index profile of a designed pattern using fluorine as a sole additive. Therefore, when the glass article made by the method of the present invention is used as a glass preform for fabricating an optical fiber, the optical fiber having improved hydrogen resistance and radiation resistance can be fabricated. When the glass soot preform is dehydrated prior to the addition of fluorine at lower temperature, the water content in glass article can be extremely reduced without affecting the amount of fluorine to be added. Further, the method of making a glass article according to the present invention does not require any special technique such as carbon monoxide flame, plasma flame or the sol-gel method.

We claim:

1. A method of making a glass article which comprises heating a cylindrical glass soot preform which has a larger bulk density in its axially extending center part than in its peripheral part surrounding said center part in an atmosphere comprising a fluorine-containing compound and an inert gas to add fluorine to the preform and then vitrifying the fluorine added preform to obtain a transparent glass article, wherein the heating is carried out in two heating is substeps under such conditions that a partial pressure of the fluorine-containing compound in the first heating substep is 1.3 to 2.5 times higher than that in the second heating substep whereby the glass article contains fluorine in substantially the same concentration at any part of the glass article, said partial pressure being controlled such that the decrease impartial pressure in the second heating substep compensates for the lower bulk density at the peripheral part of the preform whereby a substantially equal amount of fluorine is added to the preform at any part of the preform.

2. The method according to claim 1, wherein the fluorine-containing compound is $SiF_4$ or $Si_2F_6$.

3. The method according to claim 1, wherein the heating is carried out in a muffle made of high purity carbon.

* * * * *